United States Patent [19]

Gunnergaard et al.

[11] 4,228,892
[45] Oct. 21, 1980

[54] APPARATUS FOR THE STEPWISE ADVANCE OF MOULDS FORMED BY JUXTAPOSED IDENTICAL MOULD PARTS

[75] Inventors: Marius Gunnergaard, Lyngby; Ole A. Jacobsen, Tisvildeleje, both of Denmark

[73] Assignee: Dansk Industri Syndikat, A/S, Herlev, Denmark

[21] Appl. No.: 961,057

[22] Filed: Nov. 16, 1978

Related U.S. Application Data

[63] Continuation of Ser. No. 776,928, Aug. 11, 1977.

[30] Foreign Application Priority Data

Mar. 18, 1976 [DK] Denmark .............................. 1179/76

[51] Int. Cl.³ .............................................. B65G 23/00
[52] U.S. Cl. .................................... 198/832; 198/848
[58] Field of Search ............... 198/832, 844, 321, 804, 198/698, 699, 848; 164/324, 323, 329

[56] References Cited

U.S. PATENT DOCUMENTS

| | | | |
|---|---|---|---|
| 2,189,080 | 2/1940 | Novak | 198/699 |
| 3,754,636 | 8/1973 | Boy | 198/844 |
| 3,871,534 | 3/1975 | Bursk | 198/832 X |

*Primary Examiner*—Robert B. Reeves
*Assistant Examiner*—Douglas D. Watts
*Attorney, Agent, or Firm*—Imirie & Smiley

[57] ABSTRACT

A travelling grate conveyor for advancing a mould consisting of juxtaposed identical mould parts is associated with an endless mould supporting belt or conveyor formed by a plurality of closely spaced and interconnected rod members extending transversely of the longitudinal direction of the conveyor. The upper run of the belt rests on and is advanced by the travelling grate or walking beam conveyor.

5 Claims, 4 Drawing Figures

APPARATUS FOR THE STEPWISE ADVANCE OF MOULDS FORMED BY JUXTAPOSED IDENTICAL MOULD PARTS

This is a continuation, of application Ser. No. 776,928, filed Mar. 11, 1977.

FIELD AND BACKGROUND OF THE INVENTION

This invention relates to an apparatus for the production of moulds composed of identical mould parts produced successively in a pressing chamber from where they are displaced on to a guide pathway on which the mould parts are juxtaposed and advanced in intermittent time with their production.

In an apparatus of this type disclosed in British Specification No. 1,419,592, the guide path is a travelling grate or walking beam conveyor, at least one set of grate bars or beams is both reciprocable in the longitudinal direction of the guide pathway and movable in the vertical direction, whereas the other set of grate bars or beams perferably is prevented from longitudinal movement and is arranged for being raised to the level of the first set of grate bars prior to the initiation of the lowering movement thereof, and for being again lowered after the termination of the raising movement of the first set of grate bars. Such arrangement means that the mould is kept at one and the same level during the stepwise advance thereof, i.e. is not subject to any unwanted movement in the vertical direction and is subject to the necessary step-by-step movement.

In this prior art apparatus the area of the total effective supporting face of each set of grate bars must necessarily be somewhat less than half of the mould bottom area which results in the occurrence of a relatively high specific surface pressure between the mould and the grate bars. In the case of breaks in the normally continuous operation of the apparatus, difficulties may arise due to the fact that after the pouring operation, vapour makes its way towards the outside of the mould, thus also towards its bottom, whereby the compressive strength of the mould sand, on account of its increased moisture content, can be reduced so much that the grate bars form grooves in the mould bottom face. Also, the increased moisture content may make the mould sand so sticky as to cause it to adhere to the grate bars.

Heretofore, these difficulties have been overcome by emptying the guide path in the case of interruptions in the mould part production, i.e. by continuing the advancing of mould subsequent to a casual stop in the production of mould parts.

An object of the invention is to provide an apparatus in which such emptying process becomes unnecessary so that interruptions in the production process will only result in minimum production losses and require no particular attention on part of the operators as far as the function of the guide path is concerned.

SUMMARY OF THE INVENTION

In the apparatus according to the invention the guide pathway comprises a travelling grate or walking beam conveyor associated with a mould supporting belt or endless conveyor including closely spaced rod members resting on the travelling grate bars and extending transversely thereof. The supporting area of such a belt may amount to substantially more than half of the mould bottom area because the joints or spaces between successive rod members may have a width that is only a small fraction of the width of the rods, or may even be almost entirely closed in the operative position of the rods. The specific surface pressure on the underside of the mould may thus be reduced so much as to make the disadvantages aforesaid insignificant in practice.

If the rod members are sufficiently rigid they will furthermore render possible a substantial simplification and cost-reduction of the travelling grate conveyor in that each set of grate bars may be reduced to only two bars for supporting the belt rod members at, or in the vicinity of, their ends.

The reduced specific surface pressure moreover has the effect that there is less risk of causing damage to the moulds which, in particularly disadvantageous circumstances may cause the poured liquid metal to break through the bottom of the mould. If, in spite of all, such accident should occur in the apparatus according to the invention, the damage caused to the guide pathway may readily and quickly be remedied, namely by simply replacing the damaged belt rod or rods which in this situation will have protected the travelling grate proper against damage.

BRIEF DESCRIPTION OF THE DRAWINGS

A preferred embodiment of the apparatus according to the invention shall now be more fully described with reference to the accompanying drawing, in which.

DETAILED DESCRIPTION OF THE PREFERRED EMBODIMENT

Figure 4:
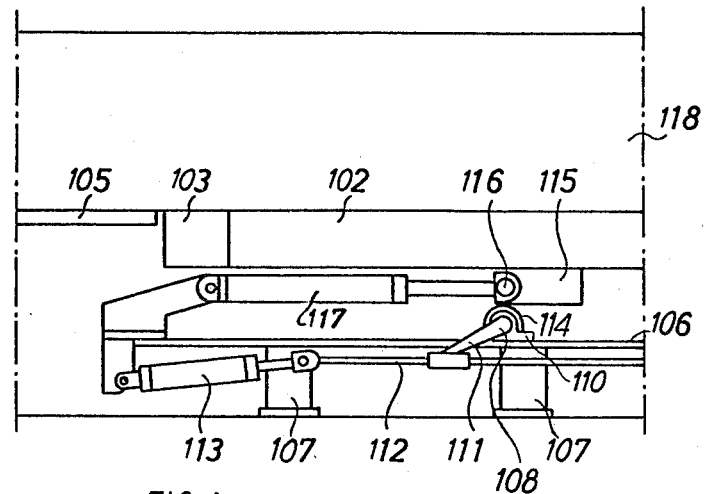
FIG. 4 is an elevational view of the left-hand or delivery end of the machine disclosed in the British Pat. Specification No. 1,419,592.

The machine in British Pat. Specification No. 1,419,592 is depicted in FIG. 4. The guideway formed by the travelling grate conveyor bars 102, 103 comprises a bottom frame 106 resting on supports 107 and carrying the grate bars 102 via rotatable transverse shafts 108 having eccentric ends that are journalled in bearings 110 on the bottom frame 106. Each shaft 108 is coupled through a connecting rod 111 to a draw bar 112 extending along the guideway and reciprocated lengthwise by means of a pneumatic cylinder 113.

Each transverse shaft 108 associated with the longitudinally movable grate bats 102 carries a pair of freely rotatable rollers 114 which support a pair of short rails 115 that are interconnected via a cross-member 116. By means of appropriate fork pieces the grate bars 102 are supported by the cross-member 116 to which a hydraulic cylinder 117 is connected and is operative to impart a reciprocating movement to the grate bars 102. During such movement the rails 115 run on the rollers 114.

The grate bars 103 are prevented from lengthwise movement but may be supported for vertical movement in a manner corresponding to the bars 102 by means of eccentric transverse shafts, cross-members, rollers, and a pneumatic cylinder corresponding to cylinder 113. However, at one or more points the bars 103 are secured in such a way that they cannot, in their entirety, run on the rollers which, nevertheless, permit unimpeded expansion and contraction of these grate bars 103 caused by changing temperature conditions.

Figure 1:
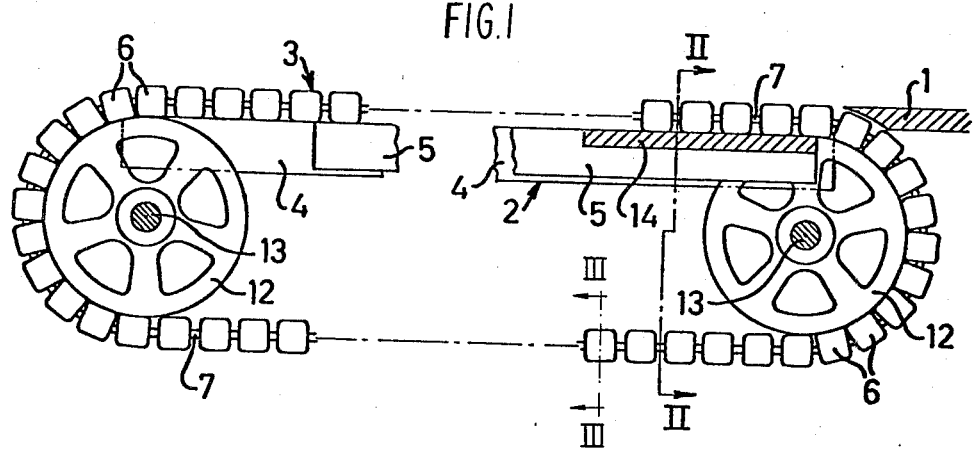
FIG. 1 is a rather diagrammatical longitudinal section along line I—I in FIG. 2.
Figure 2:
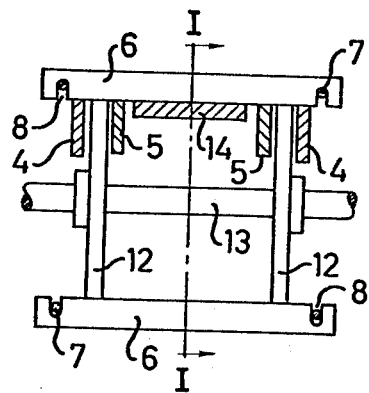
FIG. 2 is a cross-sectional view along line II—II in FIG. 1.

FIG. 1 shows a bottom plate 1 belonging to a mould part pressing chamber, not otherwise shown, which may be of conventional construction. From this bottom plate the successively produced mould parts, or blocks, are displaced on to a guide channel or conveyor pathway comprising a travelling grate or walking beam conveyor 2 and an endless rod belt 3 associated therewith.

In principle the travelling grate or walking beam conveyor 2 may be built up in the same way as disclosed in British Patent Specification No. 1,419,592 with the modification that each set of grate bars comprises only two single bars 4 and 5, respectively. The bars 4 are movable only in the vertical direction, whereas the bars 5 are also reciprocable in the horizontal direction. In the situation shown in the drawing, both sets of grate bars are shown in their topmost position, and the bars 4 are ready for being lowered, whereupon the bars 5 are displaced to the left for advancing the mould, not shown.

However, the mould is not supported directly by the travelling grate 2. In fact, this grate is surrounded or enclosed by endless rod belt 3, the upper run of which is supported and stepwise or intermittently advanced by the travelling grate with its upper side at exactly the same level as the bottom plate 1 of the pressing chamber.

Figure 3:
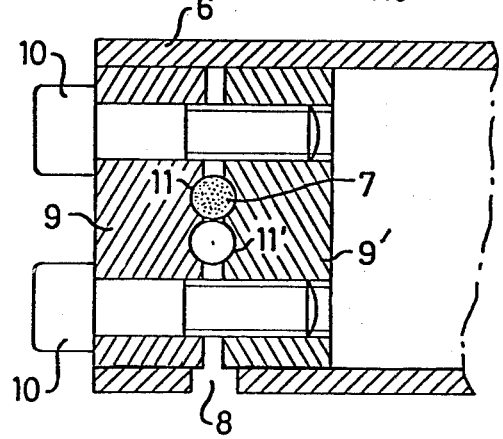
FIG. 3 is a longitudinal section taken on line III—III of FIG. 1, at one end of a belt rod on a substantially larger scale.

In the embodiment shown, the belt 3 consists of tubes 6 which are of substantially square section and so interconnected that the belt may be regarded as non-extensible in the longitudinal direction. This can be important for maintaining the required "weighting" or pressing together of the individual parts of the mould. In the drawing, the square tubes 6 are interconnected by means of a pair of steel wires 7 received in notches 8 in the tubes near their ends, and the connection between the wires 7 and the tubes 6 may expediently be established by releasable clamping as shown in FIG. 3. In this case provision has been made for a pair of clamps 9 and 9' at the end of square tube 6 which by means of screws 10 can be clamped together with the wire 7. Said clamps may, as shown, be provided with double grooves or seats 11 and 11', of which the latter serves for facilitating repairs to the belt in the case of any damage. In such case the damaged portion or section of the belt need only be cut free and replaced by a new portion or section of the same length and with its wires clamped between seats 11'. Initially, the rod belt may also consist of such sections of a suitable length which provide ease of replacement according to need.

The rod belt 3 runs in a well-known manner on supporting rollers 12 with shafts 13 journalled in bearings, not shown, and can, if desired, be kept suitably tensed in a well-known manner.

The rod members may be otherwise assembled than shown in the drawing, for example by means of chain links at their ends, or by means of an embracing band of a suitable material, such as a steel band or wire gauze, or they may be embedded in, and function as cross braces in, a belt of rubber or the like material. At the end adjacent the bottom plate 1 an additional supporting plate 14 may be provided to ensure that the belt is always situated at the correct level.

What is claimed is:

1. An apparatus for the stepwise or intermittent advance of a plurality of objects which successively are provided to said apparatus, said apparatus defining the pathway for intermittently advancing the objects and comprising a walking beam conveyor comprised of a plurality of sets of beams;

a pair of roller means respectively disposed at the opposite ends of and in alignment with said walking beam conveyor for rotation on axes disposed transversely of the pathway and with their upper peripheries substantially coplanar with the upper positions of said sets of beams;

and an endless, elongate belt type conveyor trained around said roller means and supported by said sets of beams at the coplanar upper positions of said sets of beams, whereby the objects are supported and intermittently advanced by said belt type conveyor, said belt type conveyor comprising a plurality of transversely disposed, rigid rod members for supporting the objects, said rod member constituted by a tube of substantially rectangular cross-section including spaced substantially parallel side walls connected by spaced substantially parallel inner and outer walls, wherein the side walls of each tube are provided with aligned openings adjacent their respective end portions, a first clamp member mounted in each end portion of each tube and having a clamping face substantially aligned between the inner edges of said aligned openings, a second clamp member mounted in each end portion of each tube and having a clamping face opposite to and cooperative with the clamping face of said first clamp member, and means releasable securing each of said first and second clamp members together, the clamping faces of said members jointly defining a clamp area extending transversely of the end portion of the tube substantially intermediate the height of said side walls, and flexible, non-extensible means connecting said rod members as a unitary endless structure and maintaining the spacing of said rod member, said connecting means extending through said tube openings and comprising strand like members which are secured to the said tubes in said clamp area to constitute an endless conveyor trained around said rollers and surrounding said walking beam conveyor with said inner walls engaging said rollers and being supported by said walking beam conveyor.

2. Apparatus according to claim 1 wherein said objects being conveyed are a plurality of aligned sand moulds which are successively produced in and discharged from a mould pressing chamber onto an elongate pathway for movement beneath a casting station, and wherein said rod members are so closely spaced that the total supporting area thereof is at least equal to the total area of the spaces between said members.

3. Apparatus according to claim 2 wherein said connecting means between adjacent tubes has a length that it just sufficient to enable bending of said endless conveyor around said roller means.

4. Apparatus according to claim 1, wherein the clamping faces of cooperative clamp members define two parallel clamp areas respectively for securing with said connecting means.

5. Apparatus according to claims 1 or 4 wherein each said tube is provided adjacent each end thereof with a slot across its inner wall and up the side walls thereof with the end portions of said slot defining said aligned openings, whereby said connecting means may be threaded through said aligned openings by insertion through said slot.

* * * * *